(12) United States Patent
Huang et al.

(10) Patent No.: US 11,758,400 B2
(45) Date of Patent: Sep. 12, 2023

(54) APPARATUSES AND METHOD FOR GRANTING A PERMIT TO NETWORK DEVICES FOR JOINING A NETWORK

(71) Applicant: LEDVANCE GmbH, Garching bei Munich (DE)

(72) Inventors: Huajin Huang, Shenzhen (CN); Li Lu, Shenzhen (CN); Wuqiang Liao, Shenzhen (CN); Jie Zeng, Shenzhen (CN)

(73) Assignee: LEDVANCE GMBH, Garching bei Munich (DE)

( * ) Notice: Subject to any disclaimer, the term of this patent is extended or adjusted under 35 U.S.C. 154(b) by 401 days.

(21) Appl. No.: 16/863,345

(22) Filed: Apr. 30, 2020

(65) Prior Publication Data

US 2020/0389793 A1    Dec. 10, 2020

(30) Foreign Application Priority Data

May 6, 2019  (CN) .......................... 201910373026.3

(51) Int. Cl.
| | |
|---|---|
| *H04W 12/08* | (2021.01) |
| *G06F 8/65* | (2018.01) |
| *G06F 21/60* | (2013.01) |
| *G06K 7/14* | (2006.01) |
| *H04L 9/40* | (2022.01) |
| *H04W 4/20* | (2018.01) |
| *H04W 48/16* | (2009.01) |
| *H04W 4/80* | (2018.01) |

(52) U.S. Cl.
CPC .............. *H04W 12/08* (2013.01); *G06F 8/65* (2013.01); *G06F 21/602* (2013.01); *G06K 7/1413* (2013.01); *G06K 7/1417* (2013.01); *H04L 63/0884* (2013.01); *H04W 4/20* (2013.01); *H04W 48/16* (2013.01); *H04W 4/80* (2018.02)

(58) Field of Classification Search
CPC ....... H04W 12/08; H04W 4/20; H04W 48/16; H04L 63/0884; G06F 21/602; G06K 7/1413; G06K 7/1417
USPC ............................................................. 726/4
See application file for complete search history.

(56) References Cited

U.S. PATENT DOCUMENTS 6,209,093 B1 * 3/2001 Venkatesan ............. G06F 21/64
                                                          713/176
2019/0312726 A1 * 10/2019 Sierra ................... H04L 63/104
(Continued)

*Primary Examiner* — Sai Ming Chan
(74) *Attorney, Agent, or Firm* — Hayes Soloway PC

(57) ABSTRACT

A commissioning tool for granting a network joining permit to network devices for joining a network includes a network install code generating unit for generating network install codes (NICs), a memory unit configured to save the NICs, a transmitter configured to transmit the NICs generated by the network install code generating unit to network devices and a network coordinating device. The commissioning tool also includes a user inter-face configured to receive user commands to transmit the NICs generated by the network install code generation unit, and a network control unit, the network control unit being in functional communication with the memory unit, the transmitter and the user interface. The network control unit is configured to instruct the transmitter to transmit the NICs upon receiving a command from the user over the user interface.

15 Claims, 6 Drawing Sheets

(56) References Cited

U.S. PATENT DOCUMENTS

2020/0396613 A1\* 12/2020 Duo ................... H04W 12/009
2021/0068198 A1\* 3/2021 Michielsen ........... H04W 40/28

\* cited by examiner

APPARATUSES AND METHOD FOR GRANTING A PERMIT TO NETWORK DEVICES FOR JOINING A NETWORK

CROSS-REFERENCE TO RELATED APPLICATIONS AND PRIORITY

This patent application claims priority from Chinese Patent Application No. CN 201910373026.3 filed May 6, 2019. This patent application is herein incorporated by reference in its entirety.

TECHNICAL FIELD

The technical field of present application generally relates to networks. In particular, the present discloser relates to a tool as well as a system and a method for providing a permit to network devices to join a network.

BACKGROUND

For network security reasons, install codes are used for network devices to join a wireless network. Usually, a network coordinator has access to an install code and can enable network devices to join the network. The network coordinator can get the install code by means of different techniques, e.g. using a smart phone to scan a barcode, such as QR code (quick response code) or using an NFC (near-field communication) technology. However, in some commercial systems, especially after installation, it can be difficult for the users to get an access to the install code by scanning a matrix barcode or to get the install code by using an NFC technology, in particular because of long distances.

SUMMARY

The object of the present application is to provide an easy and secure possibility for network devices to join a network.

According to a first aspect, a commissioning tool for granting a network joining permit to network devices for joining a network is provided. A network may be a wireless network of devices configured to communicate with any wireless communication protocol. A network device may be any networkable device configured to serve the purpose of any specific network by actively and/or passively participating in the functioning of the network.

The commissioning tool comprises a network install code (generating unit for generating one or more network install codes. A network install code is an access code needed in order for devices to join the network.

The commissioning tool also comprises a memory unit configured to save the one or more network install codes and a transmitter configured to transmit the one or more network install codes generated by the network install code generating unit to network devices and to a network coordinating device.

The commissioning tool further comprises a user interface configured to receive user commands to transmit the one or more network install codes generated by the network install code generating unit.

The commissioning tool also comprises a network control unit. The network control unit is in functional communication with the memory unit, the transmitter and the user interface, and is configured to read out the one or more network install codes saved in the memory unit and to instruct the transmitter to transmit the one or more network install codes upon receiving a command via the user interface. In particular, upon receiving the command to transmit a network install code, the network install code can be transmitted to the network coordinating device and/or to a network device.

The commissioning tool can be configured for a network system according to the Zigbee standard (IEEE 802.15.4-based specification), in particular, Zigbee 3.0 standard.

The network install code generating unit can be configured to randomly generate network install codes, in particular, by means of a random number generator implemented in the network install code generating unit. Due to the randomly generated network install codes, the network security can be increased.

The network install code generating unit may be configured to generate a plurality of network install codes, and the memory unit may be configured to save a list comprising the plurality of network install codes, wherein the network control unit is configured to read the list with the plurality of network install codes and to instruct the transmitter to transmit the list with the plurality of network install codes to a network coordinating unit. By transmitting a list with the plurality of network install codes to the network coordinating device, the device commissioning can be performed in a batch mode. In particular, the network install code transmission to the network coordinating device can be done in one transmission session, while the individual network install codes from the list can be assigned to each network device individually. Thus, the network devices can be added to the network, e.g. in the course of widening the network.

The user interface may comprise at least one button for receiving a user command. The user interface can be configured such that pressing the at least one button of the user interface may instruct the commissioning tool to send a network install code to the network coordinating device or a network device. The user interface may be configured such that by pressing the at least one button, e.g. by a double-click on the same button or by pressing a dedicated button, a list with the network install codes saved in the memory unit can be sent to the network coordinating device in the batch mode.

In some embodiments, the commissioning tool comprises an encryption unit, which may be a part of the network control unit, for encrypting the network install codes before transmitting the network install codes. In order to decrypt the network install codes, the network coordinating device and the network devices, respectively, may be equipped with a decryption unit. The encryption unit of the commissioning tool and the decryption units of the network device and the network coordinating device may be provided with a proprietary certificate for the purpose of the encrypted communication.

The commissioning tool may be configured as an IR commissioning tool. In particular, the transmitter of the commissioning tool may be an IR transmitter or configured to communicate with the network coordinating device and network devices over IR communication. In particular, the transmitter may comprise an IR interface configured to send a network install code or a list of network install codes to devices equipped with IR receivers or IR transceivers configured to receive the network install codes sent out by the transmitter of the commissioning tool.

The transmitter may be configured for using other communication technologies, like Bluetooth, WiFi, or UART (universal asynchronous receiver-transmitter).

In some embodiments, the transmitter may comprise a first interface for communicating with a network coordinating device and a second interface for communicating with network devices which are coordinated by the network coordinator. The first interface and the second interface may both use the same communication technology, e.g. IR or Bluetooth, for sending out the network install codes. The first interface and the second interface may also use different communication technologies. For instance, the first interface may be configured to use Bluetooth technology, while the second interface may be configured to use IR technology. In some embodiments, the first interface may use IR technology and the second interface may use Bluetooth. In some embodiments, the first interface may use the UART or WiFi, while the second interface uses the IR technology.

In some embodiments, the commissioning tool comprises a transceiver for transmitting and receiving commands, wherein the transmitter is a part of the transceiver. In particular, the transceiver of the commissioning tool may be used for receiving commands from the user for remotely controlling the commissioning tool.

In some embodiments, the commissioning tool may comprise an indicator, e.g. an LED (light emitting diode) indicator. The indicator may be configured to indicate the status of the commissioning tool for better controlling the operation of the commissioning tool. In some embodiments, the indicator may indicate, e.g. by a blink, that the transmission of a network install code and/or a list of network install codes has been accomplished.

According to a second aspect, a network coordinating device for granting a network joining permit to network devices for joining a network is provided.

The network coordinating device comprises a transceiver configured to receive at least one network install code from a commissioning tool, in particular, according to the first aspect, and at least one network install code from a network device. The network coordinating device further comprises a memory unit configured to save at least one network install code received from the commissioning tool.

The network coordinating device also comprises a network control unit which is in functional communication with the transceiver and the memory unit. The network control unit is configured to receive a network install code received by the transceiver from a network device, to read out the at least one network install code saved in the memory unit, and to grant the permit for the network device to join the network, if the at least one network install code received from the network device matches with the at least one network install code saved in the memory unit.

The transceiver may be configured to receive a plurality of network install codes, and the memory unit may be configured to save a list of network install codes, wherein the network control unit is configured to grant the permit for the network device to join the network, if the network install code received from the network device matches with at least one network install code in the list of network install codes saved in the memory unit. The network coordinating device is thus configured to enable the batch mode transmission described above.

The network control unit may be configured to initiate a network device installation procedure by sending a network joining permit initiation signal to a network device, prompting the network device to submit a network install code to the network coordinating device.

The network coordinating device may comprise an indicator, e.g. an LED indicator. The indicator may be configured to indicate the status of the network coordinating device for better control of the operation of the network coordinating device. In some embodiments, the indicator may indicate, e.g. by a blink, that the transmission of a network install code and/or a list of network install codes to the network coordinating device has been accomplished.

The transceiver of the network coordinating device may be an IR transceiver configured to communicate with the commissioning tool and network devices over IR communication. In particular, the transceiver may be configured to receive a network install code or a list of network install codes from an IR transmitter or IR transceiver of the commissioning tool and to transmit the network joining permit initiation signal to a network device equipped with an IR transceiver. The transceiver may be configured for using other communication technologies, like Bluetooth, WiFi, or UART (universal asynchronous receiver-transmitter).

According to a third aspect, a network device configured to join a network by using a network install code is provided. The network device comprises a transceiver configured to receive a network install code from a commissioning tool, in particular, over IR communication. The network device further comprises a memory unit configured to save the network install code received from the commissioning tool and a network control unit. The network control unit is in functional communication with the transceiver and the memory unit, and is configured to search for a joinable network, and, upon finding a joinable network, to read out the network install code saved in the memory unit and to instruct the transceiver to transmit the network install code to a network coordinating device for getting a network joining permit to the network device for joining the network.

The network control unit may be configured to detect whether a network install code has been received by the transceiver and to start the search for a joinable network upon detecting that a network install code has been received by the transceiver. Thus, a network mode can remain in an energy-saving, sleep- or stand-by mode until a network install code from the commissioning tool is received.

The network device may comprise an indicator, e.g. an LED indicator. The indicator may be configured to indicate the status of the network device for better controlling the operation of the network device. In some embodiments, the indicator may indicate, e.g. by a blink, that the transmission of a network install code to the network device has been accomplished.

According to a fourth aspect, a method for providing a network joining permit to at least one network device for joining a network is provided. The method comprises generating, in particular, randomly generating, at least one network install code by a network install code generation unit of a commissioning tool. The method also comprises transmitting the at least one network install code to a network coordinating device as well as transmitting the at least one network install code to at least one network device. The method further comprises verifying whether the network install code sent to a network device has been sent to the network coordinating device, and granting the joining permit to the network device, if verified that the network install code sent to the network device has been sent to the network coordinating device.

The transmitting of the at least one network install code to the network coordinating device may comprise transmitting a list of network install codes, wherein the verifying whether the network install code sent to a network device has been sent to the network coordinating device, comprises verifying whether the network install code sent to the network device matches with at least one network install code in the list of network install codes. By transmitting a list of network install codes to the network coordinating device, the device commissioning can be performed in a batch mode, in particular, for multiple network devices.

The method may comprise searching by a network device for a joinable network and transmitting a network install code from the network device to a network coordinating device upon finding a joinable network. By transmitting the network install code only after finding a joinable network, a particularly energy-saving operation of the network devices can be achieved.

The method may comprise initiating a network device installation procedure by sending a network joining permit initiation signal to a network device, prompting the network device to submit an install code to the network coordinating device. The network joining permit initiation signal can be used as a wake-up signal for network devices to start searching for a joinable network.

In the following description, details are provided to describe the embodiments of the present specification. It shall be apparent to one skilled in the art, however, that the embodiments may be practiced without such details.

BRIEF DESCRIPTION OF THE DRAWINGS

Some parts of the embodiments have the same or similar elements. The same or similar elements may have same names or similar reference numbers. Repeating the description of such elements may be omitted in order to reduce redundant descriptions.

DETAILED DESCRIPTION OF THE INVENTION

Figure 1:
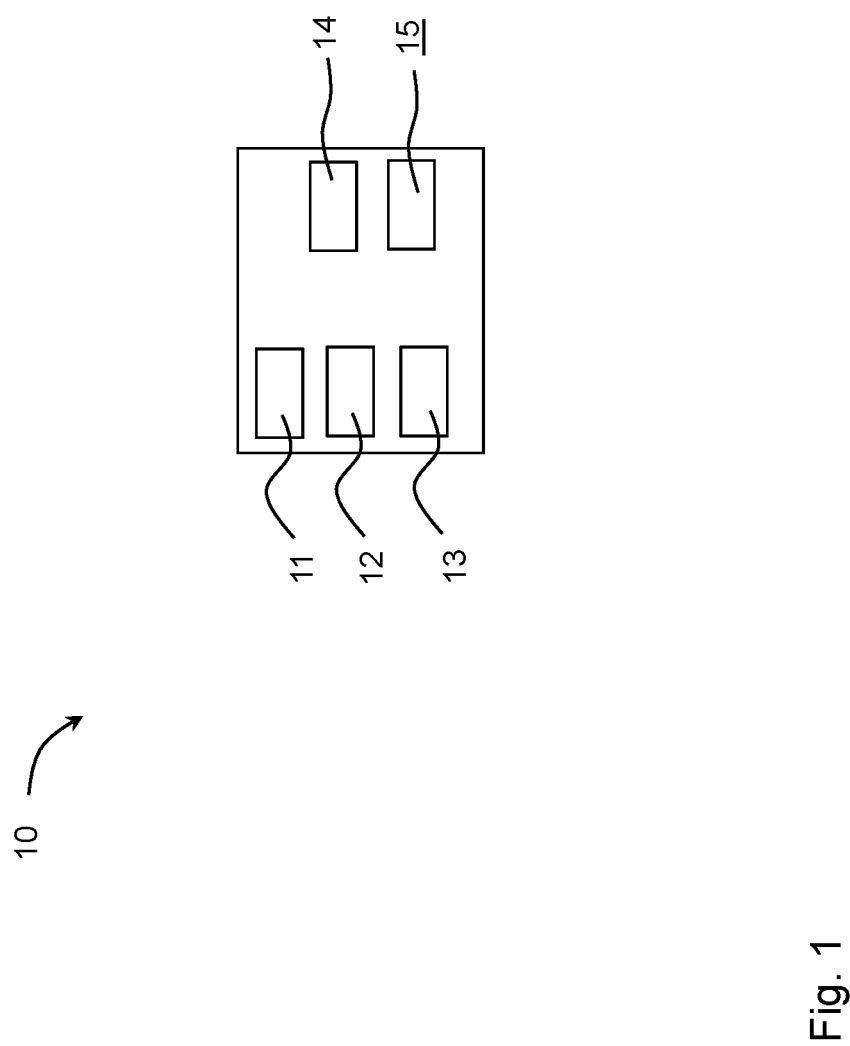
FIG. 1 shows schematically a commissioning tool for providing a network joining permit to network devices for joining a network, according to an exemplary embodiment.

FIG. 1 shows schematically a commissioning tool for providing a network joining permit to network devices for joining a network, according to an embodiment. The commissioning tool 10 comprises a network install code generating unit 11, a transmitter 12 and a user interface 13. The network install code generating unit 11 is configured to generate network install codes (NICs). In the present embodiment, the network install code generating unit 11 is configured to randomly generate NICs.

The transmitter 12 is configured to send the network install codes generated by the network install code generating unit 11 to network devices and to a network coordinator. The user interface 13 is configured for receiving user commands to transmit the network install codes, in particular, to the network coordinator and to the network devices, respectively.

The commissioning tool 10 further comprises a memory unit 14 configured to save one or more network install codes generated by the network install code generating unit 11. The commissioning tool 10 also comprises a network control unit 15. The network control unit 15 is in functional communication with the network install code generating unit 11, the transmitter 12, the user interface 13 and the memory unit 14. The network control unit 15 is configured to read the one or more network install codes saved in the memory unit 14 and to instruct the transmitter 12 to send out one or more network install codes, upon receiving a send-out command from the user over the user interface 13.

In this embodiment, the commissioning tool is configured for a network system according to the Zigbee standard (IEEE 802.15.4-based specification), in particular, Zigbee 3.0 standard.

In some embodiments, the network install code generating unit 11 is configured to generate a plurality of network install codes and the memory unit 14 is configured to save a list comprising the plurality of network install codes generated by the network install code generating unit 11, wherein the network control unit 15 is configured to read out the list with the plurality of network install codes and to instruct the transmitter 12 to send out the list with the plurality of network install codes to a coordinator upon receiving a user command over the user interface 13.

In some embodiments, the commissioning tool 10 also comprises an encryption unit configured to encrypt the network install codes before transmitting the network install codes to the coordinator or to the network devices, respectively. In some embodiments, the encryption unit is a part of the network control unit 15. In some embodiments, the commissioning tool 10 comprises a transceiver, wherein the transmitter 12 is a part of the transceiver. The transceiver may be further configured to receive commands for remotely controlling the commissioning tool 10.

In some embodiments, the user interface 13 comprises at least one button for receiving user commands, such that pressing the at least one button causes the transmitter to transmit a network install code or a list with network install codes, respectively.

The transmitter 12 is an IR (infrared) transmitter. In particular, the transmitter 12 may comprise an IR interface configured to send a network install code or a list of network install codes to network devices and a network coordinator, each equipped with IR receivers or IR transceivers configured to receive the network install codes sent out by the transmitter 12 of the commissioning tool 10.

In some embodiments, the transmitter 12 is configured for using other communication technologies, like Bluetooth, WiFi, or UART (universal asynchronous receiver-transmitter).

In some embodiments, the transmitter 12 may comprise a first interface for communicating with a coordinator and a second interface for communicating with network devices, whose permit to the network is coordinated by the coordinator. The first interface and the second interface may both use the same communication technology, e.g. IR or Bluetooth, for sending out the network install codes. The first interface and the second interface may also use different communication technologies. For instance, the first interface may be configured to use Bluetooth technology, while the second interface may be configured to use IR technology. Alternatively, the first interface may be configured to use IR technology and the second interface may be configured to use Bluetooth. In some embodiments the first interface may use the UART or WiFi, while the second interface uses the IR technology.

Figure 2:
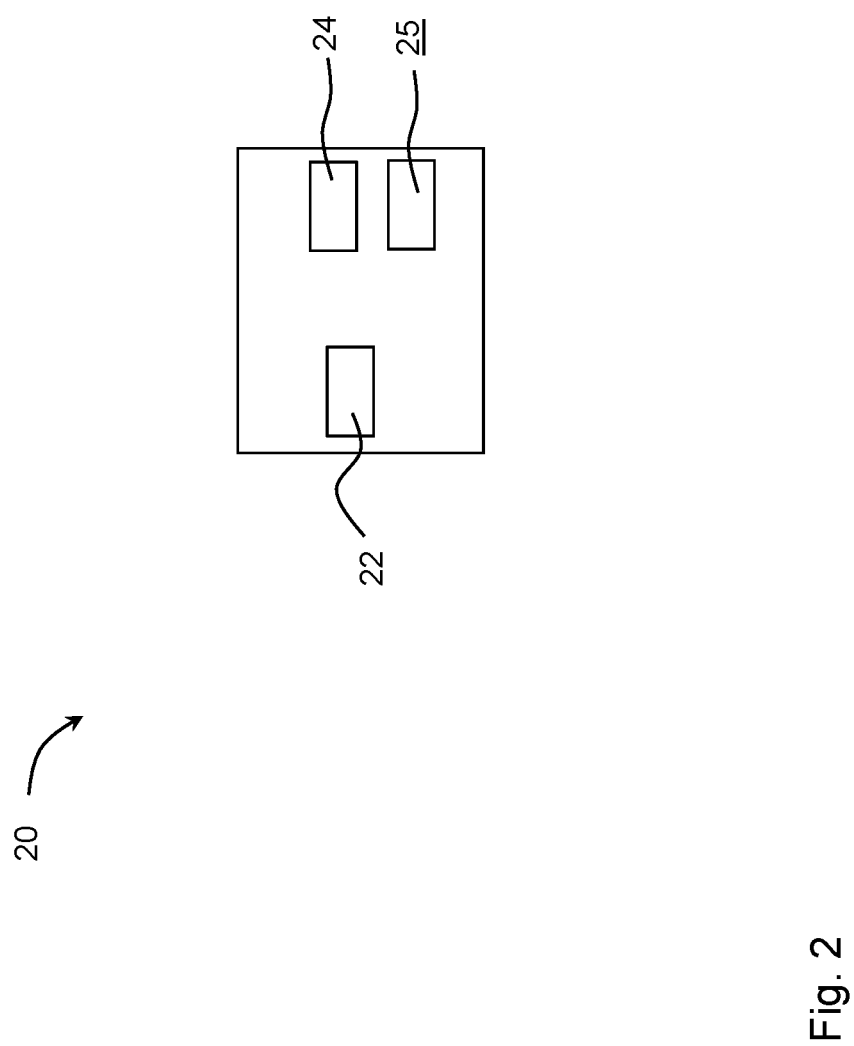
FIG. 2 shows schematically a network coordinator according to an exemplary embodiment.

FIG. 2 shows schematically a network coordinating device for granting a permit for a network device to join a network, according to an embodiment. The network coordinator device 20 comprises a transceiver 22. The transceiver 22 is configured to receive one or more network install codes from a commissioning tool 10. The transceiver 22 is further configured to receive at least one network install code from a network device. The network coordinating device 20 further comprises a memory unit 24 configured to save the at least one network install code received by the transceiver 22 from the commissioning tool 10. The network coordinator device 20 further comprises a control unit 25. The control unit 25 is in functional communication with the transceiver 22 and the memory unit 24. The control unit 25 is configured to receive at least one network install code received by the transceiver 22 from a network device, to read out the at least one network install code saved in the memory unit 24 and to grant the permit for the network device to join the network, if the network install code received from the network device matches with the at least one network install code saved in the memory unit 24.

In some embodiments, the transceiver 22 is configured to receive a plurality of network install codes, wherein the memory unit 24 is configured to save a list with the plurality of network install codes. The network control unit 25 may be further configured to grant the permit for a network device to join the network, if the network install code received from the network device matches at least one network install code in the list with the plurality of network install codes saved in the memory unit 24.

In some embodiments, the network control unit 25 is further configured to initiate a network device installation procedure by transmitting a network joining permit initiation signal to a network device, prompting the network device to submit a network install code to the network coordinating device 20.

Figure 3:
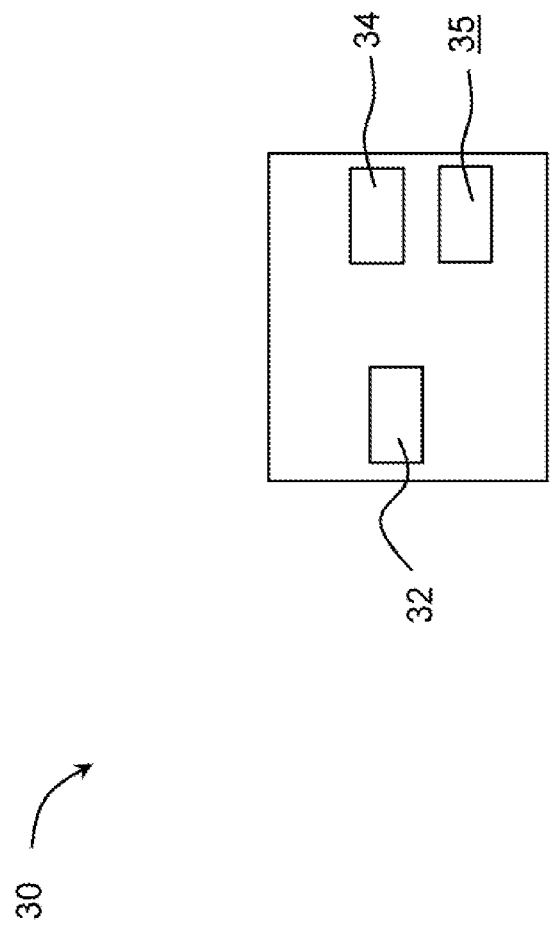
FIG. 3 shows schematically a network device according to an exemplary embodiment.

FIG. 3 shows schematically a network device according to an embodiment. The network device 30 comprises a transceiver 32 configured to receive a network install code from a commissioning tool 10. The network device 30 further comprises a memory unit 34 configured to save the network install code received from the commissioning tool 10. The network device 30 further comprises a network control unit 35 configured to search for a joinable network, and upon finding a joinable network to read out the network install code saved in the memory unit 34 and to instruct the transceiver 32 to transmit the network install code to a network coordinator 20 for joining the network.

In some embodiments, the network device 30 is configured to detect whether a network install code has been received by the transceiver and to start the search for a joinable network upon detecting that a network install code has been received by the transceiver.

Figure 4:
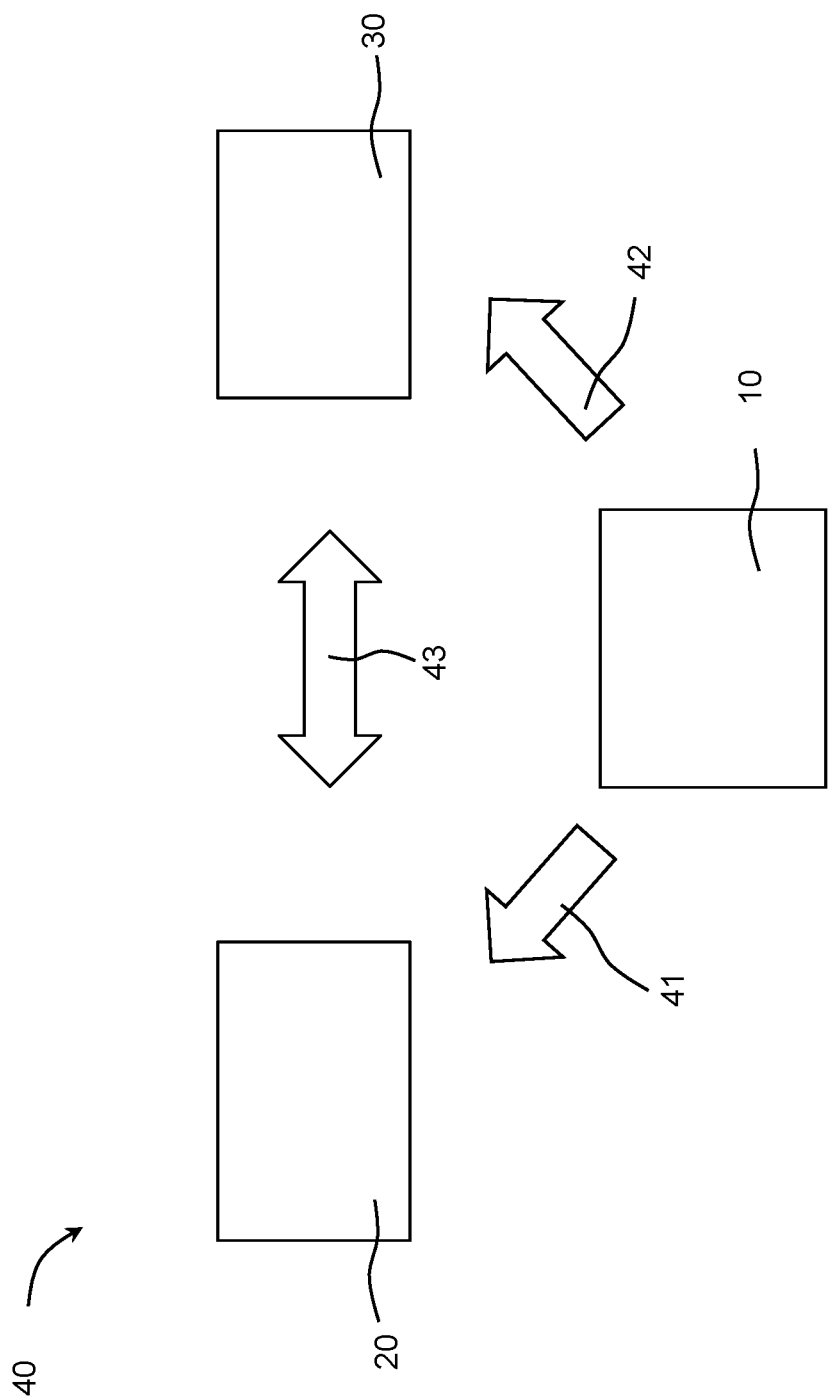
FIG. 4 shows a network according to an exemplary embodiment.

FIG. 4 shows a system according to an embodiment. The system 40 comprises a commissioning tool 10, a network coordinating device 20 and a network device 30, according to the above aspects of the present disclosure. In the embodiment of FIG. 4, the transmitter 12 of the commissioning tool 10 is an IR transmitter. The transceiver 22 of the network coordinating device 20 and the transceiver 32 of the network device 30 are IR transceivers configured to receive network install codes transmitted from the IR transmitter 12 of the commissioning tool 10. The arrows in FIG. 4 indicate the communication between the commissioning tool 10, the network coordinating device 20 and the network device 30. In particular, arrow 41 pointing from the commissioning tool 10 to the network coordinating device 20 indicates a transmission of a network install code from the commissioning tool 10 to the network coordinating device 20, while arrow 42 pointing from the commissioning tool 10 to the network device 30 indicates a transmission of the same network install code from the commissioning tool 10 to the network device 30. The bidirectional arrow 43 indicates the communication between the network coordinating device 20 and the network device 30. The communication comprises granting a permit for the network device 30 to join the network which is coordinated by the network coordinating device 20 and joining the network by the network device 30 by using the network install code transmitted from the commissioning tool 10 to the network device 30.

Figure 5:
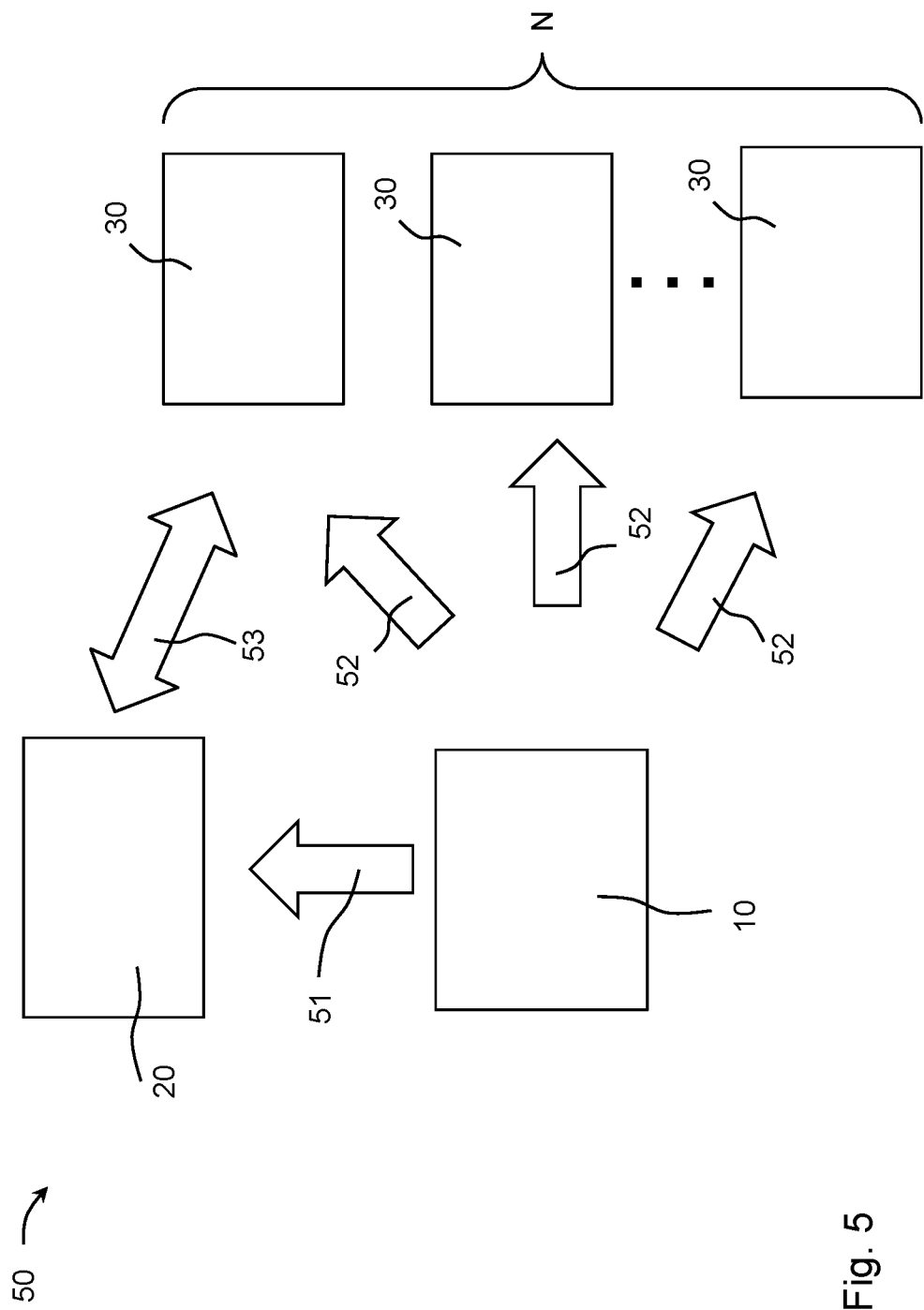
FIG. 5 shows a network according to another exemplary embodiment.

FIG. 5 shows a system according to another embodiment. The system 50 of FIG. 5 comprises a commissioning tool 10, a network coordinating device 20 and a plurality of network devices 30, according to the above described aspects of the present disclosure. The plurality of network devices 30 comprises N network devices 30. In the embodiment of FIG. 5, the transmitter 12 of the commissioning tool 10 is an IR transmitter. The transceiver 22 of the network coordinating device 20 and the transceivers 32 of the network devices 30 are IR transceivers configured to receive network install codes transmitted from the IR transmitter 12 of the commissioning tool 10. The arrows in FIG. 5 indicate the communication between the commissioning tool 10, the network coordinating device 20 and the network device 30.

In particular, arrow 51 pointing from the commissioning tool 10 to the network coordinating device 20 indicates a transmission of a list of network install codes from the commissioning tool 10 to the network coordinating device 20, while each arrow 52 directed from commissioning tool 10 to each network device 30 indicates a transmission of an individual network install code to each of the N network devices 30, from the commissioning tool 10. The bidirectional arrow 53 indicates the communication between the network coordinating device 20 and the network devices 30, comprising granting a permit for each network device 30, separately, to join the network which is coordinated by the network coordinating device 20. The arrow 53 also symbolizes the network devices 30 joining the network by using the individual network install codes received from the commissioning tool 10.

Figure 6:
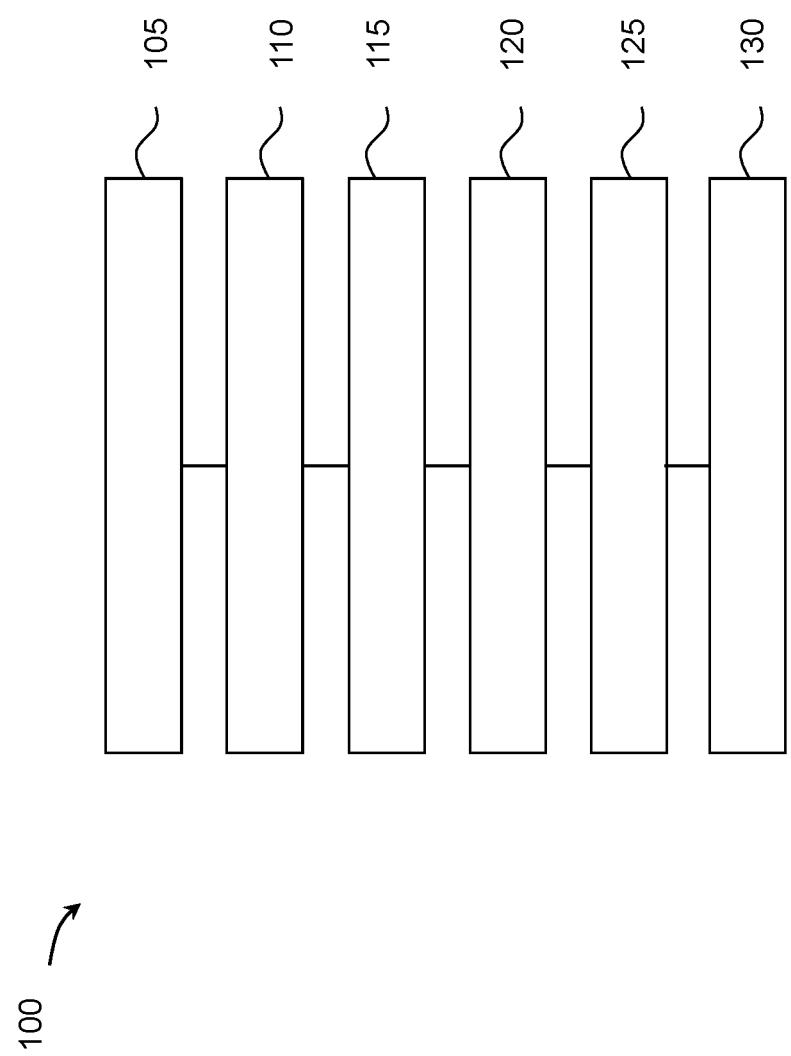
FIG. 6 shows a flowchart of a method for providing a network joining permit to a network device, according to an exemplary embodiment.

FIG. 6 shows a flowchart of a method for providing a network joining permit to a network device, according to an embodiment. The method 100 can be implemented in any network system comprising a commissioning tool 10 according to the above described first aspect, a network coordinating device 20 according to the above described second aspect and one or more network devices 30 according to the above described third aspect.

In step 105 of the method 100, the network install code generating unit 11 of the commissioning tool 10 generates a network install code. In particular, the network install code may be generated as a random network install code, e.g. by means of a random number generator incorporated in the network install code generating unit 11 of the commissioning tool 10.

In step 110, the commissioning tool 10 transmits, over the transmitter 12, the network install code generated by the network install code generating unit 11 to the network coordinating device 20. In some embodiments, the transmitting of the network install code in step 110 may be initiated by pressing a button provided on the user interface 13 of the commissioning tool 10. An indicator, e.g. an LED indicator, of the network coordinating device 20 and/or commissioning tool 10 may indicate the status of the network coordinating device 20 and/or the commissioning tool 10 during the transmission of the network install code to the network coordinating device 20. In some embodiments, the indicator may indicate, e.g. by a blink, that the transmission has been accomplished.

In step 115, upon receiving the network install code transmitted from the commissioning tool 10, the network coordinating device 20 starts the permit joining procedure, based on the network install code received from the commissioning tool 10. In particular, the network coordinating device 20 may, by sending out a command, prompt network devices 30 within reach of the network coordinating device 20 to submit a network install code for joining the network.

In step 120, the commissioning tool 10 transmits over the transmitter 12 the network install code generated by the network install code generating unit 11 to a network device 30. In some embodiments, the transmission of the network install code in step 115 may be initiated by pressing a button provided on the user interface 13 of the commissioning tool 10. An indicator, e.g. an LED indicator, of the network device 30 and/or the commissioning tool 10 may indicate the status of the network device 30 and/or the commissioning tool 10, while the network install code is transmitted to the network device 30. In some embodiments, the indicator may indicate, e.g. by a blink, that the transmission has been accomplished.

In step 125, upon receiving the network install code from the commissioning tool 10, the network device 30 starts to search for a joinable network. In step 130, the network device 30 joins the network by using the network install code received from the commissioning tool 10. In particular, the network device 30 may join the network by submitting the network install code to the network coordinating device 20 after receiving from the network coordinating device 20 a network permit initiation joining signal, prompting the network device 30 to join the network.

Steps 110 to 130 may be repeated for each further device, to install a plurality of network devices 30. In this case all further network devices 30 get the same network install code for joining the network.

Steps 105 to 130 may be repeated in order to install a second or any further network device 30. In this case, a new network install code is generated for each new network device 30 to join the network, such that a second and any further network device 30 gets its own individual network install code for joining the network. By providing individual network install codes to all network devices 30, the overall network security can be increased.

In some embodiments, step 105 may comprise generating a plurality of network install codes by the network install code generating unit 11 of the commissioning tool 10. Step 105 also may comprise saving the plurality of the network install codes as a list with the plurality of network install codes in the memory unit 14 of the commissioning tool 10.

Step 110 may further comprise reading out the list with the plurality of network install codes from the memory unit 14 and transmitting the list with the plurality of network install codes to the network coordinating device 20.

Step 120 may comprise transmitting individual network install codes from the list with the plurality of network install codes to individual network devices 30 separately. The transmission of each individual network install code to each individual network device 30, in step 120, may be carried out essentially asynchronously to the transmission of the list with the plurality of network install codes to the network coordinating device 20, in step 110.

In particular, the transmission of an individual network install code to an individual network device 30 may be carried out essentially immediately after the network install code has been generated by the network install code generating unit 11.

In some embodiments, the transmission of the individual network install codes is executed after both generating the list with the plurality of network install codes and saving the generated list with the plurality of network install codes in the memory unit 14 of the commissioning tool 10.

In some embodiments, at least some of the above described communications between the commissioning tool 10, the network coordinating device 20 and the network devices 30 are encrypted, e.g. by means of a proprietary certificate.

While at least one exemplary embodiment has been presented in the foregoing detailed description, it should be appreciated that a vast number of variations exists. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments.

The invention claimed is:

1. A commissioning tool for granting a network joining permit to network devices for joining a network, the commissioning tool comprising:
   a network install code generating unit for generating one or more network install codes,
   a memory unit configured to save the one or more network install codes,
   a transmitter configured to transmit the one or more network install codes generated by the network install code generating unit to network devices and to a network coordinating device,
   a user interface configured to receive user commands to transmit the one or more network install codes generated by the network install code generation unit, and
   a network control unit, the network control unit being in functional communication with the memory unit, the transmitter and the user interface, wherein the network control unit is configured to instruct the transmitter to transmit the one or more network install codes upon receiving a command via the user interface.

2. The commissioning tool according to claim 1, wherein the network install code generating unit is configured to randomly generate the one or more network install codes.

3. The commissioning tool according to claim 1, wherein the network install code generating unit is configured to generate a plurality of network install codes, and wherein the memory unit is configured to save a list comprising the plurality of network install codes generated by the network install code generating unit, wherein the network control unit is configured to read out the list with the plurality of network install codes and to instruct the transmitter to transmit the list with the plurality of network install codes to a network coordinating device.

4. The commissioning tool according to claim 1, wherein the user interface comprises at least one button for receiving a user command.

5. The commissioning tool according to claim 1, wherein the commissioning tool comprises an encryption unit for encrypting the one or more network install codes before transmitting the one or more network install codes.

6. The commissioning tool according to claim 1, wherein the commissioning tool is an infrared (IR) communication tool.

7. A network coordinating device for granting a network joining permit to network devices for joining a network, the network coordinating device comprising:
- a transceiver configured to receive at least one network install code from a commissioning tool and at least one network install code from a network device,
- a memory unit configured to save the at least one network install code received from the commissioning tool, and
- a network control unit, the network control unit being in functional communication with the transceiver and the memory unit, wherein the network control unit is configured to receive the at least one network install code received by the transceiver from the network device, to read out the at least one network install code saved in the memory unit and to grant a permit for the network device to join the network, if the at least one network install code received from the network device matches with the at least one network install code saved in the memory unit.

8. The network coordinating device according to claim 7, wherein the transceiver is configured to receive a plurality of network install codes, and wherein the memory unit is configured to save a list of network install codes, wherein the network control unit is configured to grant the permit for the network device to join the network, if the network install code received from the network device matches with at least one network install code in the list of network install codes, saved in the memory unit.

9. The network coordinating device according to claim 7, wherein the network control unit is further configured to initiate a network device installation procedure by sending a network joining permit initiation signal to a network device, prompting the network device to submit an install code to the network coordinating device.

10. A network device configured to join a network by using a network install code, the network device comprising:
- a transceiver configured to receive the network install code from a commissioning tool,
- a memory unit configured to save the network install code received from the commissioning tool, and
- a network control unit being in functional communication with the memory unit and configured to search for a joinable network, and upon finding the joinable network to read out the network install code saved in the memory unit and to instruct the transceiver to transmit the network install code to a network coordinating device for getting a network joining permit to the network device for joining the network.

11. The network device according to claim 10, wherein the network control unit is configured to detect whether the network install code has been received by the transceiver and to start the search for the joinable network upon detecting that the network install code has been received by the transceiver.

12. A method for providing a network joining permit to at least one network device for joining a network, the method comprising:
- generating at least one network install code by a network install code generation unit of a commissioning tool,
- transmitting the at least one network install code to a network coordinating device,
- transmitting one of the at least one network install codes to at least one network device,
- verifying whether the one of the at least one network install codes sent to the at least one network device has been sent to the network coordinating device, and
- granting the joining permit to the at least one network device, if verified that the one of the at least one network install codes sent to the at least one network device has been sent to the network coordinating device.

13. The method according to claim 12, wherein the transmitting of the at least one network install code to the network coordinating device comprises transmitting a list of the at least one network install codes, and wherein the verifying whether the one of the at least one network install codes sent to the at least one network device has been sent to the network coordinating device comprises verifying whether the one of the at least one network install codes sent to the at least one network device matches with the at least one network install code in the list.

14. The method according to claim 12, wherein the method further comprises searching by the at least one network device for a joinable network and transmitting the one of the at least one network install codes from the at least one network device to the network coordinating device, upon finding the joinable network.

15. The method according to claim 12, wherein the method further comprises initiating a network device installation procedure by sending a network joining permit initiation signal to the at least one network device, prompting the at least one network device to submit the one of the at least one network install codes to the network coordinating device.

* * * * *